(12) United States Patent
Minase et al.

(10) Patent No.: US 8,930,100 B2
(45) Date of Patent: Jan. 6, 2015

(54) DRIVING CONTROL SYSTEM FOR VEHICLE

(71) Applicants: Yuki Minase, Toyota (JP); Masashi Takagi, Nagoya (JP); Motonari Ohbayashi, Nisshin (JP); Hiroshi Shimada, Tajimi (JP); Toshihiro Takagi, Toyota (JP)

(72) Inventors: Yuki Minase, Toyota (JP); Masashi Takagi, Nagoya (JP); Motonari Ohbayashi, Nisshin (JP); Hiroshi Shimada, Tajimi (JP); Toshihiro Takagi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/711,333

(22) Filed: Dec. 11, 2012

(65) Prior Publication Data

US 2013/0166161 A1 Jun. 27, 2013

(30) Foreign Application Priority Data

Dec. 21, 2011 (JP) ................. 2011-280385

(51) Int. Cl.
*G06F 7/00* (2006.01)
(Continued)

(52) U.S. Cl.
CPC ............ *B60W 30/18* (2013.01); *B60W 10/11* (2013.01); *B60W 30/18009* (2013.01); *B60W 10/10* (2013.01); *F16H 63/50* (2013.01); *B60W 2710/0666* (2013.01); *B60W 2540/16* (2013.01); *B60W 2540/165* (2013.01); *B60W 2710/083* (2013.01); *B60W 2540/10* (2013.01); *B60W 30/1846* (2013.01); *B60W 10/06* (2013.01); *B60W 2520/10* (2013.01); *F16H 59/18* (2013.01); *F16H 2063/508* (2013.01); *B60W 30/18027* (2013.01)
USPC .............................................. 701/54; 701/53

(58) Field of Classification Search
CPC ..... B60W 30/18; B60W 10/06; B60W 10/10; B60W 30/18027; B60W 30/1846; F16H 63/50
USPC .............................................. 701/54; 705/53
See application file for complete search history.

(56) References Cited

U.S. PATENT DOCUMENTS 6,330,498 B2 * 12/2001 Tamagawa et al. ............. 701/22
7,110,869 B2 *  9/2006 Tao et al. ..................... 701/31.1
(Continued)

FOREIGN PATENT DOCUMENTS

JP    2010-018174 A    1/2010

*Primary Examiner* — Calvin Cheung
*Assistant Examiner* — Paula L Schneider
(74) *Attorney, Agent, or Firm* — Gifford, Krass, Sprinkle, Anderson & Citkowski, P.C.

(57) ABSTRACT

A vehicle has a shift mechanism and a position detection device that detects an operation position of the shift mechanism. A transmission is brought to a power transmission state when an operation unit of the shift mechanism is operated to a driving position, and is brought to a power interrupt state when the operation unit is operated to a non-driving position. A driving force limitation process for reducing the driving force of an internal combustion engine is executed when it is determined that the non-driving position has been shifted to the driving position on the basis of the operation position of the operation unit as detected by the position detection device. The driving force limitation process is prohibited when it is determined that the vehicle is traveling and that the operation unit is not operated to any of the operation positions.

4 Claims, 5 Drawing Sheets

(51) Int. Cl.
*G06F 17/00* (2006.01)
*G06F 19/00* (2011.01)
*B60W 30/18* (2012.01)
*B60W 10/10* (2012.01)
*F16H 63/50* (2006.01)
*B60W 30/184* (2012.01)
*B60W 10/11* (2012.01)
*B60W 10/06* (2006.01)
*F16H 59/18* (2006.01)

(56) References Cited

U.S. PATENT DOCUMENTS

| | | | |
|---|---|---|---|
| 8,050,831 B2 * | 11/2011 | Martin et al. | 701/54 |
| 2006/0155453 A1 * | 7/2006 | Han et al. | 701/54 |
| 2006/0190155 A1 * | 8/2006 | Meyer et al. | 701/54 |
| 2012/0197503 A1 * | 8/2012 | McGee et al. | 701/54 |

\* cited by examiner

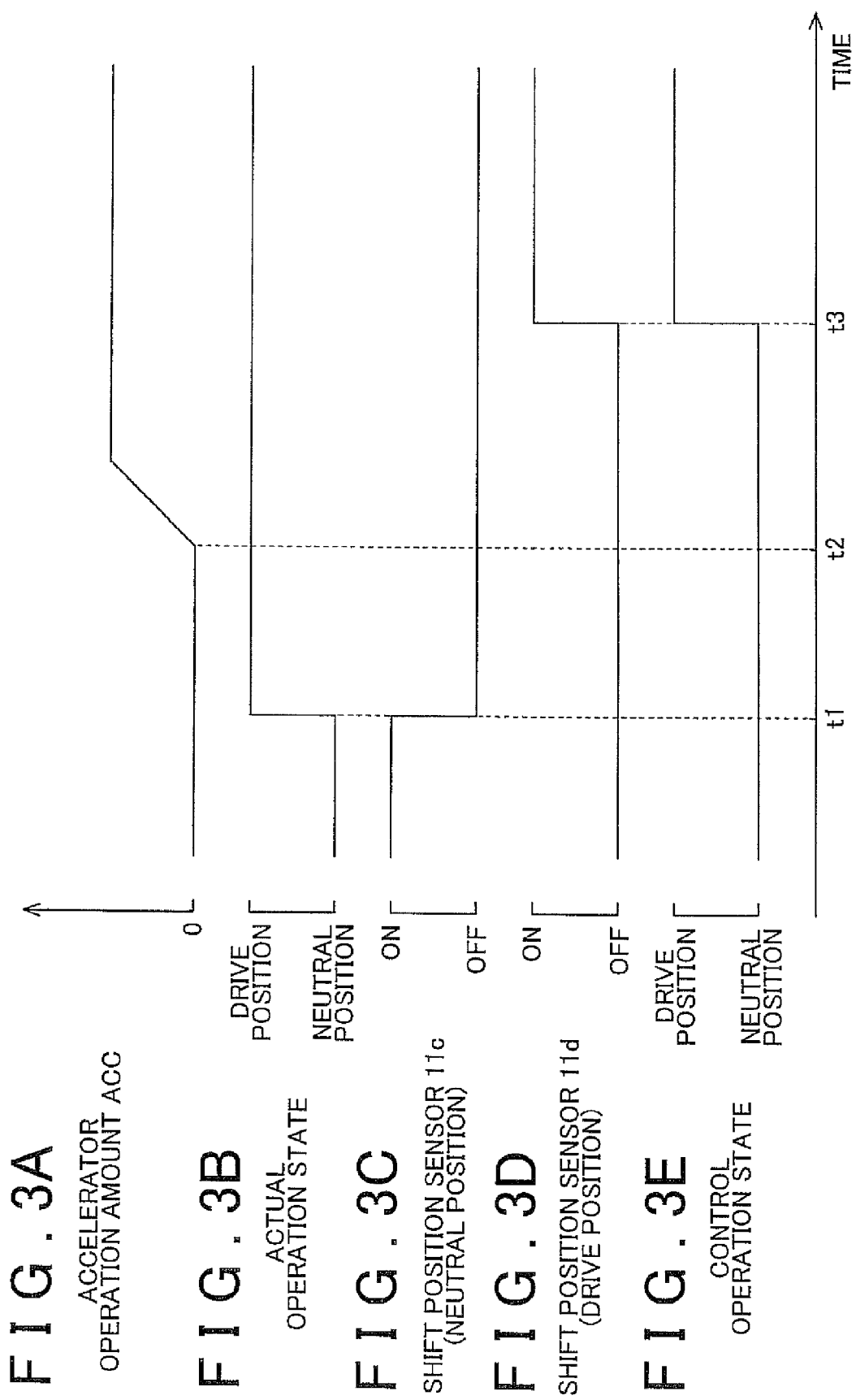

DRIVING CONTROL SYSTEM FOR VEHICLE

The disclosure of Japanese Patent Application No. 2011-280385 filed on Dec. 21, 2011 including the specification, drawings and abstract is incorporated herein by reference in its entirety.

BACKGROUND OF THE INVENTION

1. Field of the Invention

The invention relates to a driving control system for vehicles.

2. Description of Related Art

Motors such as internal combustion engines and electric motors are installed as driving sources, in vehicles such as automobiles. Such motors are coupled to wheels through a transmission. The vehicle is provided with a shift mechanism that allows switching, in response to an operation by the driver, between a driving position (for instance, a position such that the vehicle travels forward, or a position such that the vehicle travels in reverse) and a non-driving position (for instance, a parking position or a neutral position).

An operation lever, as an operation unit of the shift mechanism, is coupled to the abovementioned transmission (specifically, to a shift fork of the transmission). When the operation lever is operated to a driving position, the transmission is brought to an operation state (power transmission state) in which a driving force is transmitted from the motor to the wheels, and when the operation lever is operated to a non-driving position, the transmission is brought to an operation state (power interrupt state) in which transmission of the driving force from the motor to the wheels is interrupted.

In vehicles of a related art, wherein driving force is transmitted from a motor to wheels (Japanese Patent Application Publication No. 2010-18174 (JP-2010-18174 A)), a driving force limitation process for limiting the driving force that is outputted by the motor is executed when an operation position of a shift mechanism is shifted from a non-driving position to a driving position, in a state that the accelerator operation member of the vehicle is operated to the on state. In such a device, the driving force that is transmitted from the motor to the wheels is kept small even in a case where the shift mechanism is operated from a non-driving position to a driving position in a state of increased motor output that results from the operation of the accelerator operation member. As a result, discomfort to the driver resulting from transmission of the driving force can be suppressed, and a decrease in drivability is suppressed.

Shift position sensors for detecting the operation position of the operation lever are ordinarily mounted in the shift mechanism. Such shift position sensors are made up of detection units (for instance, switches) that are respectively mounted in the vicinity of each operation position of the operation lever, The operation position of the shift mechanism is detected on the basis of output signals of the detection units.

In such a position detection device, a state is detected in which, although temporarily, the operation lever is not operated to any of the operation positions, when the operation lever is at intermediate positions between operation positions in the course of the shifting operation of the shift mechanism. In cases where, for instance, the operation lever is operated slowly, such a state may in some instances go on for a comparatively long time, depending on the way in which the operation lever is operated to the respective operation positions.

When a state is brought about in which the operation lever is not operated to any of the operation positions upon operation of the operation lever from a non-driving position to a driving position, the operation state of the transmission that is coupled to the operation lever is brought to a power transmission state, and the operation position of the shift mechanism detected by the position detection device is not a driving position. At this time, the vehicle starts as a result of the actual operation state of the transmission being brought to the power transmission state, despite the fact that the operation state of the transmission, as determined on the basis of the detection result by the position detection device, is still a power interrupt state. Accordingly, the above-described driving force limitation process is initiated, as a result of which the vehicle may stall and drivability decreases, when the operation position of the operation lever is brought thereafter to an adequate position and the position detection device detects that the operation position of the operation lever is a driving position.

In the above-described device, thus, a discrepancy may arise between the actual operation state of the transmission and the operation state of the transmission as determined on the basis of the detection result by the position detection device. Drivability may be impaired on account of that discrepancy.

SUMMARY OF THE INVENTION

The invention provides a driving control system for a vehicle that allows suppressing decreases in drivability through execution of a driving force limitation process with adequate timing.

A driving control system for a vehicle of an aspect of the invention is provided with: a shift mechanism that is used in a vehicle in which a motor as a driving source is coupled to wheels via a transmission, and that is configured such that an operation unit coupled to the transmission is selectively shifted to one operating position of a driving position and a non-driving position; a position detection device that detects the operation position of the operation unit on the basis of an output signal of a detection unit that is attached to each of the operation positions of the operation unit; and a controller that executes a driving force limitation process for limiting a driving force that is outputted from the motor, when it is determined that the operating unit is shifted from the non-driving position to the driving position on the basis of the operation position of the operation unit as detected by the position detection device, in a state that the accelerator operation member of the vehicle is operated to an on state; wherein the shift mechanism brings the transmission to a power transmission state in which the driving force from the motor is transmitted to the wheels, when the operation unit is operated to the driving position, and brings the transmission to a power interrupt state in which transmission of the driving force from the motor to the wheels is interrupt, when the operation unit is operated to the non-driving position; and the controller prohibits the driving force limitation process when it is determined that the vehicle is traveling and that the operation unit is not operated to any of the operation positions on the basis of a detection result by the position detection device.

The driving control system for a vehicle of an aspect of the invention allows suppressing decreases in drivability through execution of the driving force limitation process with adequate timing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A to FIG. 3E each shows a timing chart illustrating an example of a state in which a driving force limitation process is prohibited;

DETAILED DESCRIPTION OF EMBODIMENTS

Figure 1:
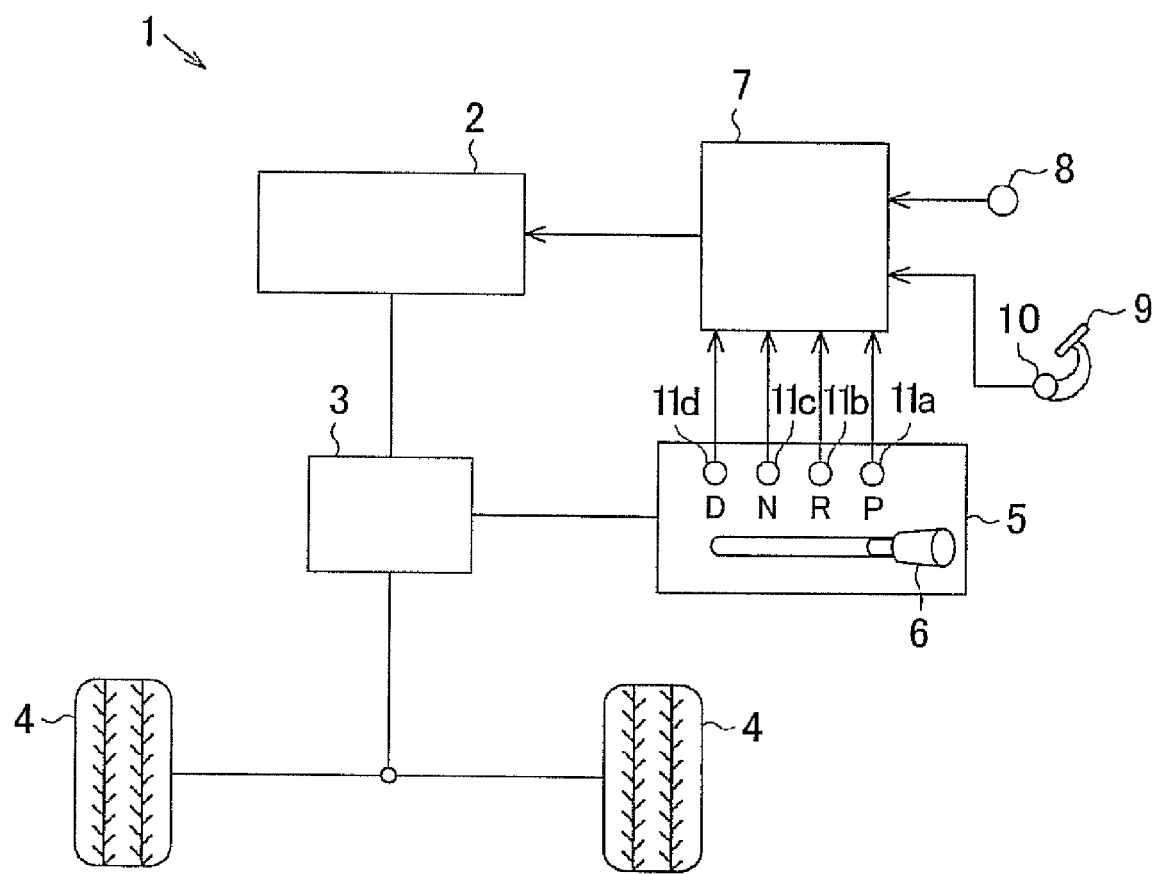
FIG. 1 is a schematic diagram illustrating the schematic configuration of a driving control system for a vehicle according to a specific embodiment of the invention.

A specific embodiment of the driving control system for a vehicle according to the invention is explained next. As illustrated in FIG. 1, an internal combustion engine 2 and an automatic transmission 3 are installed in a vehicle 1. The internal combustion engine 2 is a driving source and the automatic transmission 3 performs automatically a shift operation. The internal combustion engine 2 is connected to wheels 4 via the automatic transmission 3. As a result, a driving force outputted by the internal combustion engine 2 is transmitted to the wheels 4 via the automatic transmission 3 and the like. The wheels 4 rotate as a result, thereby enabling travel of the vehicle 1. The automatic transmission 3 is provided with a plurality of gears. The automatic transmission 3 is configured in such a manner that combinations of the plurality of gears can be modified so as to select any one from among a plurality of gear positions established beforehand. The automatic transmission 3 can transmit the driving force outputted by the internal combustion engine 2 to the wheels 4, and can interrupt transmission of the driving force outputted by the internal combustion engine 2.

A shift mechanism 5 for switching the operation mode of the automatic transmission 3 is mounted in the vehicle 1. The select lever 6 of the shift mechanism 5 is coupled to the automatic transmission 3 (specifically, to the shift fork thereof). The select lever 6 is shifted, by the driver, to any one of a plurality of operation positions that include a parking position, a reverse travel (reverse) position, a neutral position and a forward travel (drive) position. The operation mode of the automatic transmission 3 for each operation position of the select lever 6 will be explained further on.

When the select lever 6 is operated to the parking position, there is prohibited rotation of the wheels 4 through meshing of gears in the automatic transmission 3, and a power interrupt state is brought about in which transmission of the driving force outputted by the internal combustion engine 2 to the wheels 4 is interrupted.

When the select lever 6 is operated to the neutral position, the prohibiting of rotation of the wheels 4 through gear meshing in the automatic transmission 3 is released, and a power interrupt state is brought about in which transmission of the driving force outputted by the internal combustion engine 2 to the wheels 4 is interrupted. When the select lever 6 is operated to the drive position, a power transmission state is brought about in which the driving force outputted by the internal combustion engine 2 is transmitted to the wheels 4 in a forward rotation direction. The vehicle 1 is brought herein to a state in which the vehicle is capable of forward travel. When the select lever 6 is operated to the reverse position, a power transmission state is brought about in which the driving force outputted by the internal combustion engine 2 is transmitted to the wheels 4 in a reverse rotation direction. The vehicle 1 is brought herein to a state in which the vehicle is capable of reverse travel. In the present embodiment, the select lever 6 functions as an operation unit.

An electronic control system 7 (controller) is installed in the vehicle 1.

The electronic control system 7 executes various controls relating to the internal combustion engine 2 and the automatic transmission 3. Various sensors are attached in the vehicle 1. The sensors are a vehicle speed sensor 8 for detecting the travel speed (vehicle speed SPD) of the vehicle 1, and an accelerator position sensor 10 for detecting an operation amount (accelerator operation amount ACC) of an accelerator operation member 9 (accelerator pedal, accelerator lever or the like). In addition, there are provided, for instance, shift position sensors 11a, 11b, 11c, 11d, attached on the shift mechanism 5, for detecting the operation position (shift position SP) of the shift mechanism 5 (specifically, the select lever 6). The shift position sensor 11a is a switch that is switched on when the select lever 6 approaches a parking position, and that is switched off when the select lever 6 moves away from the parking position. The shift position sensor 11b a switch that is switched on when the select lever 6 approaches the reverse position and that is switched off when the select lever 6 moves away from the reverse position. The shift position sensor 11c is a switch that is switched on when the select lever 6 approaches the neutral position and that is switched off when the select lever 6 moves away from the neutral position. The shift position sensor lid is a switch that is switched on when the select lever 6 approaches the drive position and that is switched off when the select lever 6 moves away from the drive position. Output signals of the various sensors are input to the electronic control system 7. For instance, a driving circuit for driving the internal combustion engine 2 and a driving circuit for driving the automatic transmission 3 are connected to the electronic control system 7. In the present embodiment, the shift position sensors 11a to 11d function as detection units that are respectively attached for each operation position of the operation unit. The shift position sensors 11a to 11d and the electronic control system 7 function as a position detection device that detects the operation position of the operation unit on the basis of an output signal of the detection unit.

The electronic control system 7 adjusts the driving force outputted by the internal combustion engine 2 in accordance with, for instance, the accelerator operation amount ACC. The electronic control system 7 switches the gear position of the automatic transmission 3 on the basis of the accelerator operation amount ACC, the vehicle speed SPD and the shift position SP.

Upon start of the vehicle 1, the driver ordinarily shifts the operation position of the select lever 6 from a non-driving position (parking position or neutral position) to a driving position (drive position or reverse position), and, thereafter, operates the accelerator operation member 9, which is in an off-state, to an on-state. When the driver is in a hurry, the operation of bringing the accelerator operation member 9 from the off-state to the on-state (hereafter also referred to as "on-operation") is performed in some instances earlier than the operation of shifting the select lever 6 from a non-driving position to a driving position. In such cases, the driver, even though intending to perform the above-described ordinary operation, actually performs an operation that is different from the ordinary one, i.e. the driver shifts the select lever 6 from a non-driving position to a driving position in a state where the accelerator operation member 9 is operated to the on state.

In such instances where the driver inadvertently performs an operation different from an ordinary operation, a difference may arise between the behavior of the vehicle 1 as envisaged by the driver and the actual behavior of the vehicle 1. Specifically, the driver intends the vehicle 1 to start when the accelerator operation member 9 is on-operated. In actuality, by contrast, the vehicle 1 starts through transmission of the driving force of the internal combustion engine 2 to the wheels 4 upon shifting of the select lever 6 from a non-driving position to a driving position after the accelerator operation member 9 is operated to the on state. Such a discrepancy with respect to the behavior of the vehicle 1 causes discomfort to the driver, and constitutes a factor that decreases the drivability of the vehicle 1.

In the present embodiment, a driving force limitation process that suppresses the driving force that is outputted by the internal combustion engine 2, as compared with that during an ordinary operation, is executed when the select lever 6 is shifted from a non-driving position (parking position or neutral position) to a driving position (drive position or reverse position) in a state where the accelerator operation member 9 is operated to the on state. In consequence, the operation unit is shifted from a non-driving position to a driving position in a state wherein driving force outputted by the motor is increased when the accelerator operation member 9 is operated to the on state. In other words, switching of transmission from a power interrupt state to a power transmission state is suppressed. The decrease in drivability caused by transmission of this driving force is thus suppressed.

In the system of the present embodiment, the above driving force limitation process is executed when the accelerator operation member 9 is operated from an off-state to the on state before the operation position of the select lever 6 is shifted from a non-driving position to a driving position, for instance when the driver attempts to start the vehicle 1 in a hurry. Thereby, the driving force that is outputted by the internal combustion engine 2 is suppressed through execution of the driving force limitation process, also in a case where the driver shifts the select lever 6 from a non-driving position to a driving position, in a state where the accelerator operation member 9 is operated to the on state. As a result there is suppressed discomfort to the driver as the vehicle 1 begins traveling through transmission of the driving force to the wheels 4.

In the position detection device of the present embodiment, the operation position of the select lever 6 is detected on the basis of the output signals from the shift position sensors 11*a* to 11*d* that are attached to respective operation positions of the select lever 6. As a result, the shift position sensors 11*a* to 11*d* are all brought to a turned-off state when, in the process of shifting the operation position of the select lever 6, the select lever 6 is brought to an intermediate position between operation positions (specifically, to an intermediate position between two adjacent operation positions). Thus, a state is detected wherein the select lever 6 is not operated to any of the operation positions. The state in which the detection result by the position detection device shows that the select lever 6 is not operated to any of the operation positions is a temporary state. Nevertheless, such a state may persist for a comparatively long time, depending on the operation mode of the select lever 6, in cases where, for instance, the operation speed of the select lever 6 is low.

When the above state arises upon operation of the select lever 6 from a non-driving position to a driving position, the operation state of the automatic transmission 3 that is coupled to the select lever 6 is brought to a power transmission state, and the operation position of the select lever 6 as detected by the position detection devices is not a driving position. The vehicle 1 starts as a result of the actual operation state of the automatic transmission 3 being brought to a power transmission state, despite the fact that, at this time, the operation state of the automatic transmission 3, as grasped on the basis of the detection result by the position detection device, is still in a power interrupt state. As a result, the operation position of the select lever 6 is brought thereafter to an adequate position, and the above-described driving force limitation process is initiated when the position detection device detects that the operation position of the select lever 6 is at the driving position. Therefore, drivability may decrease, during travel of the vehicle 1, due to stalling of the vehicle 1.

In the system of the present embodiment, thus, a discrepancy may arise between the actual operation state of the automatic transmission 3 and the operation state of the automatic transmission 3 as grasped by the position detection device. Such a discrepancy may result in decrease of drivability.

The driving force limitation process in the system of the present embodiment is prohibited when the below-described condition (1) and condition (2) are both satisfied, even in a case where there is satisfied the execution condition of the driving force limitation process on the basis of which the select lever 6 is operated from a non-driving position (parking position or neutral position) to a driving position (drive position or reverse position), in a state where the accelerator operation member 9 is operated to the on state. Condition (1) specifies that the vehicle 1 is traveling.

Specifically, a gear position other than the lowest-speed gear position is set as the gear position of the automatic transmission 3. Condition (2) the state in which all the shift position sensors 11*a* to 11*d* are turned off is continued, for a predetermined period (for instance, several seconds) established beforehand, immediately before it is determined that the operation position of the select lever 6 has been shifted from a non-driving position to a driving position.

In the system of the present embodiment, a lowest-speed gear position of large speed ratio, is set as the gear position of the automatic transmission 3 upon stop of the vehicle 1. Thus, the higher the travel speed of the vehicle 1, the higher the speed of small speed ratio, of the gear position to which the gear position the automatic transmission 3 is changed, during forward travel of the vehicle 1. As a result, the speed ratio of the automatic transmission 3 becomes lower than a predetermined ratio. In other words, there is set, as the gear position of the automatic transmission 3, a gear position other than the lowest-speed gear position; accordingly, it becomes possible to determine, with good precision, that the vehicle 1 is traveling forward. Condition (1) is set in the present embodiment with the above consideration in mind.

The above condition (1) is set in the present embodiment. Therefore, the driving force limitation process is prohibited when it is determined that the vehicle 1 is travelling, even when it is determined that the operation position has been shifted from a non-driving position to a driving position, on the basis of the operation position detected by the position detection device, in a state where the accelerator operation member 9 is operated to the on state. As a result, travel of the vehicle 1 is initiated when the actual operation state of the automatic transmission 3 is firstly brought to the power transmission state, upon operation of the select lever 6 from a non-driving position to a driving position. Thereafter, the limitation of the above driving force by the driving force limitation process is not performed in a case where it is determined that the operation position detected by the position detection device has been shifted to a driving position. Sudden decreases of the driving force outputted by the internal combustion engine 2 during travel of the vehicle 1 can be suppressed as a result. Stalling of the vehicle 1 caused by a decrease in the driving force is thus suppressed, and decreases in drivability can be accordingly suppressed.

The above condition (2) is set in the present embodiment. Therefore, it becomes possible to accurately grasp that the vehicle 1 is now in a travelling state as a result of the actual operation state of the automatic transmission 3 being brought to a power transmission state, despite the fact that the operation state of the automatic transmission 3, as determined on the basis of the detection result by the position detection device, remains in a power interrupt state, as described above. Decreases in drivability can thus be suppressed by prohibiting the driving force limitation process on the basis of that determination. A period over which the vehicle 1 can be thus accurately determined to be in a travelling state is worked out beforehand, on the basis of experimental or simulation results, and is stored in the electronic control system 7, as the predetermined period of condition (2). In the present embodiment it is determined, from the fact that the above condition (2) is satisfied, that the operation unit is not operated to any of the operation positions on the basis of the detection result, immediately before it is determined that the operation position of the select lever 6 has been shifted from a non-driving position to a driving position. Specifically, it is not determined that the operation unit is not operated to any of the operation positions on the basis of the detection result by the position detection device, immediately before it is determined that the operation state has been shifted from a non-driving position to a driving position in the case of a state where all the shift position sensors 11a to 11d are turned off over a very short lapse of time accompanying the ordinary operation of the select lever 6.

The execution procedure and effect of the driving limitation routine having the above driving force limitation process are explained in detail next with reference to the flowchart illustrated in FIG. 2A and FIG. 2B. For instance, the series of processes illustrated in the flowchart are executed periodically, with interruptions, at interspersed lapses of time, by the electronic control system 7.

Figure 2A:
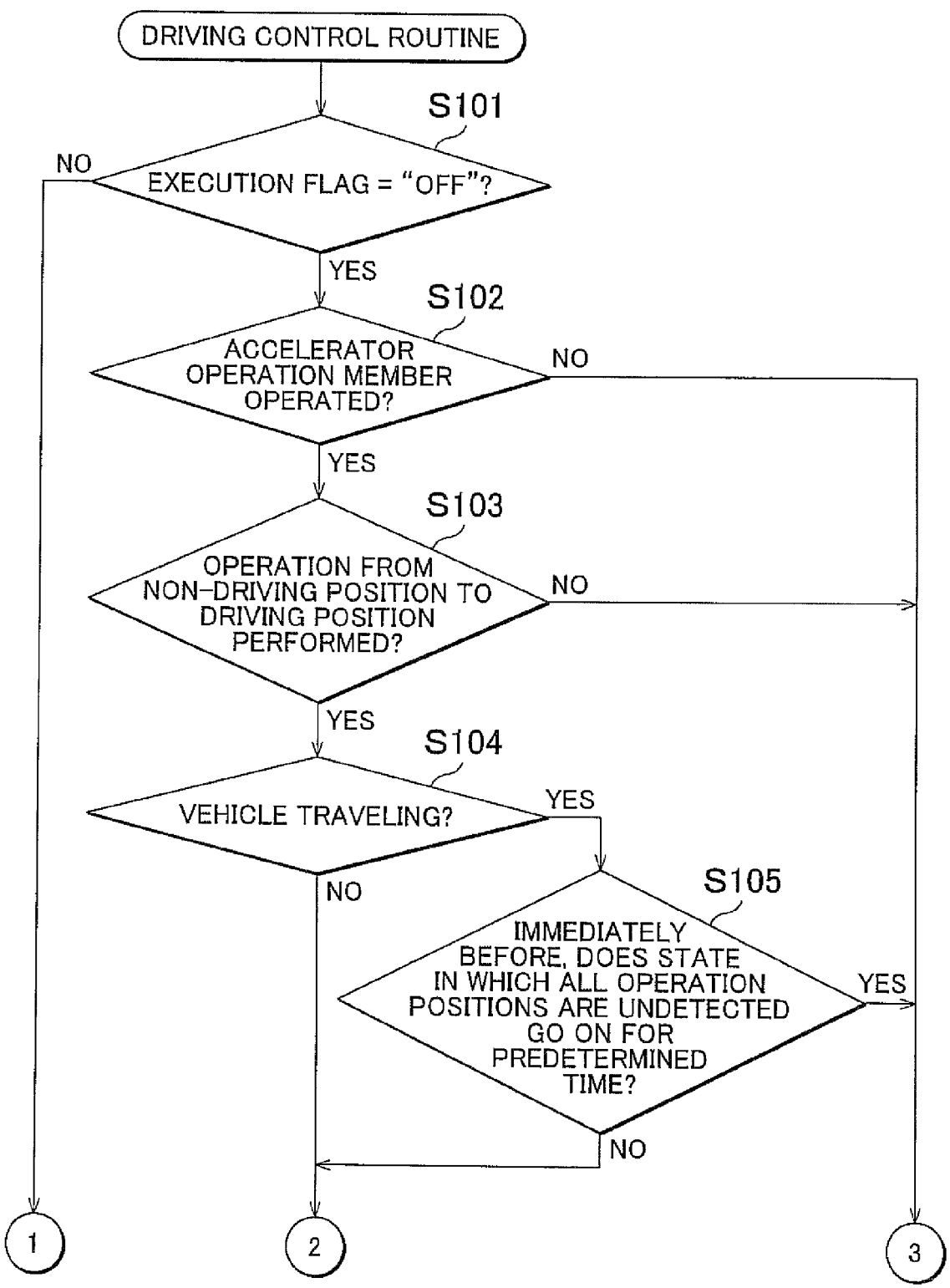
FIG. 2A is flowchart illustrating an execution procedure of a driving limitation routine.
Figure 2B:
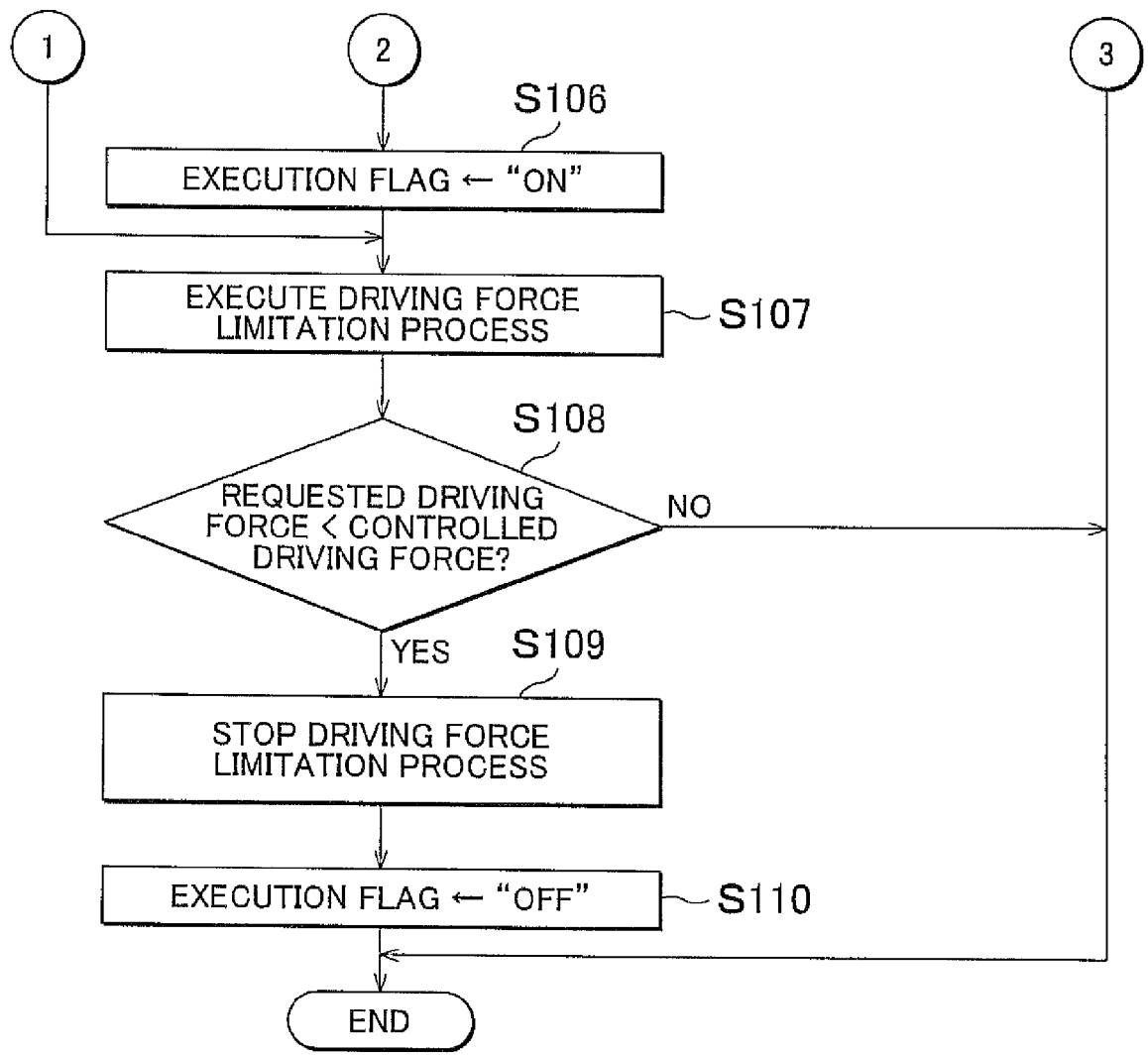
FIG. 2B is flowchart illustrating an execution procedure of a driving limitation routine.

In the routine, firstly, an execution flag is set to an off state, as illustrated in FIG. 2A and FIG. 2B (S101). The execution flag is set to an on state by the driving force limitation process (S107). On the other hand, the execution flag is set to an off state when the driving force limitation process is stopped. In the process of S101, it is determined, on the basis of the operation state of the execution flag, whether the driving force limitation process is stopped or not.

If the execution flag is set to an off state (S101: YES), it is considered that the driving force limitation process is not being executed, and it is determined whether or not a state has been brought about (specific state) wherein the select lever 6 is shifted from a non-driving position to a driving position, in a state where the accelerator operation member 9 is operated to the on state (S102 and S103). Specifically, it is determined whether condition (3) and condition (4) below are both satisfied. Condition (3): the accelerator operation member 9 is on-operated. Specifically, the accelerator operation amount ACC is greater than a predetermined value. Condition (4): regarding the operation position of the shift mechanism 5 as grasped on the basis of the detection result by the position detection device, the operation position at a time of a previous execution of the present routine is a non-driving position and the operation position upon current execution of the present routine is a driving position.

When either condition (3) or condition (4) is not satisfied (S102: NO or S103: NO), the above specific state does not hold, and the present routine is temporarily terminated without execution of subsequent processing.

On the other hand, when condition (3) and condition (4) are both satisfied thereafter through repeated execution of the present routine (S102: YES and S103: YES), it is considered that the specific state holds, and it is determined next whether or not the abovementioned condition (1) and condition (2) are satisfied (S104 and S105).

If condition (1) and condition (2) are both satisfied (S104: YES and S105: YES), the present routine is temporarily terminated without execution of subsequent processing. At this time, it is considered that there is a possibility of decrease in drivability caused, as described above, by a discrepancy between the actual operation state of the automatic transmission 3 and the operation state of the automatic transmission 3 as grasped on the basis of the detection result by the position detection device, and the driving force limitation process is prohibited.

If either condition (1) or condition (2) is not satisfied (S104: NO or S105: NO), it is considered that there is a low likelihood of drivability decreasing on account of the abovementioned offset, the execution flag is set to an on state (S106) and the driving force limitation process is initiated (S107). The execution procedure of the driving force limitation process will be explained in detail further on. Thereafter, the driving force limitation process is continued, unless the above execution flag is set to an off state (S101: NO).

A process (process from S108 to S110) relating to termination of the driving force limitation process is executed during execution of the driving force limitation process (S101: NO or S104: NO or S105: NO). Specifically, it is firstly determined whether condition (5) below is satisfied or not (S108). In condition (5), the driving force is a driving force that is to be outputted by the internal combustion engine 2 in accordance with the accelerator operation amount ACC, but is smaller than a controlled driving force, which is the driving force after being suppressed in the driving force limitation process, for instance when the accelerator operation amount ACC becomes "0" through the accelerator operation member 9 is released by the driver.

If condition (5) is not satisfied (S108: NO), the driving force limitation process is continued, without stops (process of S109 and S110 is skipped). Thereafter, if the abovementioned condition (5) is satisfied through repeated execution of the routine (S108: YES), the driving force limitation process is stopped (S109), and the execution flag is set to an off state (S110), after which the present routine is temporarily terminated. Limiting of the driving force that is outputted by the internal combustion engine 2 is stopped thereafter. Thus, the driving force is adjusted so as to match the requested driving force that is a driving force that should be output from the internal combustion engine 2 on the basis of the accelerator operation amount ACC, so as to match the requested driving force.

In the driving limitation routine of the present embodiment, the driving force limitation process is not executed when the abovementioned condition (1) and condition (2) are both satisfied even in a case where the select lever 6 is operated from a non-driving position to a driving position, in a state where the accelerator operation member 9 is operated to the on state. Herein, it becomes possible to accurately grasp that the vehicle 1 is now in a travelling state as a result of the actual operation state of the automatic transmission 3 being brought to a power transmission state, despite the fact that the Operation state of the automatic transmission 3, as grasped on the basis of the detection result by the position detection device, remains in a power interrupt state. It becomes possible to suppress sudden decreases thereafter in the driving force accompanying the detection, by the position detection device, of the operation to the driving position.

FIG. 3 illustrates an example of a state in which the driving force limitation process is prohibited. In the example illustrated in FIG. 3, the select lever 6 is at a position intermediate between the neutral position and the drive position (time t1 to t3) in a process of shifting to the drive position from a state in which the select lever 6 is operated to the neutral position (until t1).

A state is brought about in which all the shift position sensors 11*a* to 11*d* are turned off, including the shift position sensor 11*c* (FIG. 3C) and 11*d* (FIG. 3D). As a result, a state is detected, by the position detection device, in which the select lever 6 is not operated to any of the operation positions. In the present embodiment, vehicle control is executed then on the basis of the operation position (FIG. 3E) of the select lever 6 as detected immediately before the state in which the select lever 6 is not operated to any of the operation positions.

In the state in which the select lever 6 is not operated to any of the operation positions, the vehicle 1 starts if the actual operation state (actual operation state, FIG. 3B) of the automatic transmission 3 that is coupled to the select lever 6 is operated to a drive position. Meanwhile the operation state (hereafter also referred to as "control operation state", FIG. 3E) of the automatic transmission 3 as determined on the basis of the operation position of the select lever 6, as detected by the position detection device, remains at the neutral position. In the present example, the accelerator operation member 9 (FIG. 3A) is on-operated at time t2. As a result, the output of the internal combustion engine 2 increases thereafter, the vehicle 1 accelerates thereby, and the gear position of the automatic transmission 3 is shifted to a high-speed gear position.

Thereafter, at time t3, the shift position sensor 11*d* is turned on in that, for instance, the select lever 6 is operated to an adequate position. Thereupon, an operation state is brought about of the time at which the control operation state is operated to a drive position. Accordingly, the abovementioned condition (3) and condition (4) are both satisfied. If the driving force limitation process is hypothetically initiated at that time, the driving force outputted by the internal combustion engine 2 decreases despite the fact that the vehicle 1 is traveling at a comparatively high speed by the accelerator operation member 9 being operated to the on state. The vehicle 1 stalls as a result, and drivability decreases.

In the system of the present embodiment, the driving force limitation process is not initiated when the abovementioned condition (1) and condition (2) are both satisfied, even if condition (3) and condition (4), which are execution conditions of the driving force limitation process, are both satisfied. Specifically, the driving force limitation process is prohibited in a case where a state in which the shift position sensors 11*a* to 11*d* are all turned off continues for a predetermined period, established beforehand, immediately before it is determined that the vehicle 1 is traveling and that the operation position of the select lever 6 has been shifted from a non-driving position to a driving position. As a result, there is suppressed initiation of the driving force limitation process during travel (specifically, at time t3) of the vehicle 1. Decreases in drivability are accordingly suppressed by suppressing the stalling of vehicle 1.

Figure 4:
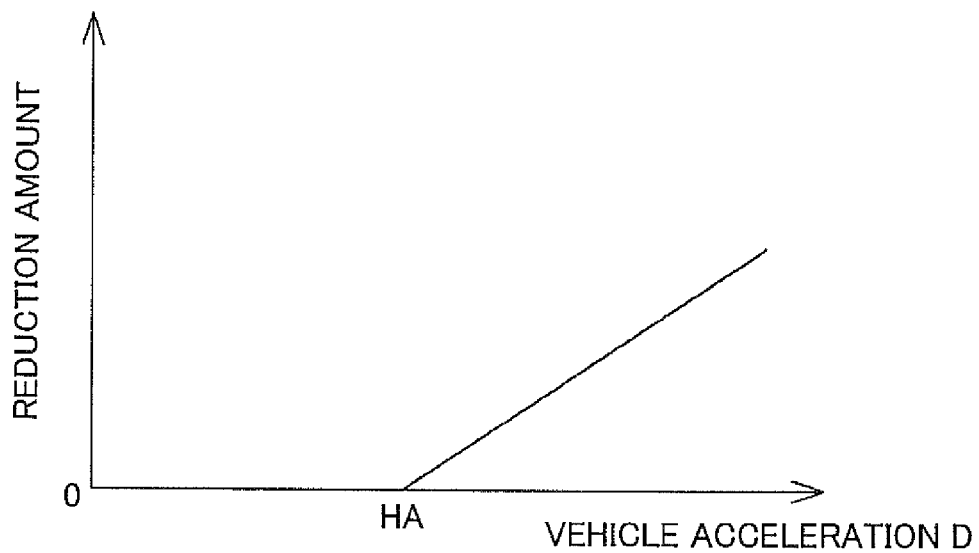
FIG. 4 is a graph illustrating a relationship between vehicle acceleration and reduction amount of a driving force by a driving force limitation process.
Figure 5:
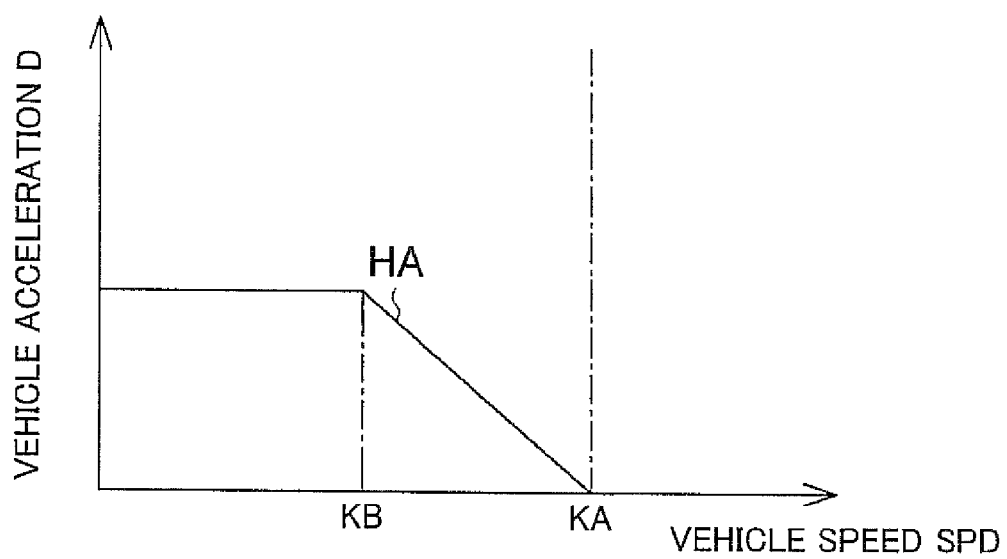
FIG. 5 is a graph illustrating a relationship between vehicle acceleration, vehicle speed and a determination value in a driving force limitation process.

A limitation mode of the driving force in the driving force limitation process (process of S107 in FIG. 2B) will be explained next in detail with reference to FIG. 4 and FIG. 5. In the driving force limitation process, suppression of the driving force that is outputted by the internal combustion engine 2 is realized by reducing the driving force by a reduction amount. Accordingly, the greater the above reduction amount is, the greater becomes the degree of suppression of the driving force by the driving force limitation process. The degree of suppression of the driving force is modified in accordance with the acceleration (vehicle acceleration D) in the advance direction of the vehicle 1, determined on the basis of a detection signal of the vehicle speed sensor 8. For instance, the greater the vehicle acceleration D, the greater the reduction amount is and the greater becomes the degree of suppression of the driving force that is outputted by the internal combustion engine 2. More specifically, for instance, when the vehicle acceleration D is smaller than a determination value HA, the above reduction amount is set to "0" and the degree of suppression of the above driving force is set to "0", as illustrated in FIG. 4. On the other hand, when the vehicle acceleration D is equal to or greater than the determination value HA, the greater the vehicle acceleration D becomes, as compared with the determination value HA, the greater becomes the increase of the above reduction amount with respect to "0", and the greater becomes the increase, with respect to "0", of the degree of suppression of the driving force that is outputted by the internal combustion engine 2.

Executing the driving force limitation process as described above obtains the effect of suppressing the driving force that is outputted by the internal combustion engine 2 so as not to cause discomfort to the driver, while avoiding useless suppression of the driving force. In situations such as those where the vehicle 1 is getting out of a muddy road, the driver repeatedly shifts in some instances the select lever 6 between a non-driving position and a driving position. In such cases the select lever 6 may sometimes be shifted from a non-driving position to the reverse position, in a state where the accelerator operation member 9 is operated to the on state. Thus, the vehicle acceleration D does not increase easily even if the select lever 6 is shifted from a non-driving position to the reverse position, in a state where the accelerator operation member 9 is operated to the on state, when the driver attempts to get the vehicle 1 out of a muddy road. As a result, the degree of suppression of the above driving force through the driving force limitation process becomes smaller. Accordingly, it becomes possible to suppress the hindrance that suppression of the driving force by the driving force limitation process poses to getting the vehicle 1 out of the muddy road. The drivability of the vehicle 1 is therefore enhanced, for example, in instances where the vehicle 1 moves off a muddy road.

The determination value HA that is used in the driving force limitation process is variably set so as to become an optimal value that is established beforehand on the basis of experimentation or the like, in accordance with the vehicle speed SPD. The determination value HA changes in response to the vehicle speed SPD, for instance as denoted by the solid line in FIG. 5. As FIG. 5 shows, the determination value HA is set to be a constant optimal value established beforehand through experimentation or the like, when the vehicle speed SPD is smaller than a predetermined speed KB. When the vehicle speed SPD is equal to or greater than the predetermined speed KB and smaller than the reference speed KA, the determination value HA decreases gradually accompanying a rise in the vehicle speed SPD. When the vehicle speed SPD is equal to or greater than the reference speed KA, the determination value HA is "0". Therefore, when the vehicle speed SPD is equal to or greater than the reference speed KA upon execution of the driving force limitation process, the degree of suppression of the driving force outputted by the internal combustion engine 2 becomes greater than "0", in accordance with the vehicle acceleration D, regardless of the magnitude relationship between the vehicle acceleration D and the determination value HA. That is, the above reduction amount is set to a value greater than "0", in accordance with the vehicle acceleration D, so as to render the degree of suppression of driving force outputted by the internal combustion engine 2 to be greater than "0", as described above. In this case, discomfort to the driver can be suppressed by accurately suppressing the above driving force when the vehicle speed SPD is greater than the reference speed KA, i.e. when the driver is likely to feel the abovementioned discomfort upon execution of the driving force limitation process.

As explained above, the present embodiment obtains the following effects. 1. The driving force limitation process is prohibited when a state in which all the shift position sensors 11a to 11d are turned off continues for a predetermined period immediately before it is determined that the vehicle 1 is traveling and that the operation position of the select lever 6 has been shifted from a non-driving position to a driving position, even when a non-driving position is determined to have been shifted to a driving position on the basis of the operation position detected by the position detection device, in a state where the accelerator operation member 9 is operated to the on state. As a result, it becomes possible to suppress stalling of the vehicle 1 that is caused by sudden decreases of the driving force outputted by the internal combustion engine 2 during travel of the vehicle 1. Decreases in drivability can be suppressed as a result.

2. It becomes possible to determine, with good precision, that the vehicle 1 is traveling from the fact that a gear position other than a lowest-speed gear position is set to the gear position of the automatic transmission 3. The above embodiment may accommodate the following variations.

The shift position sensors 11a to 11d are not limited to proximity switches. Any sensors may be used, for instance proximity sensors, provided that the sensors output dissimilar signals when the select lever 6 approaches the operation position, that is to be detected, and when the select lever 6 moves away from that operation position.

The way in which the driving force limitation process is executed can be modified arbitrarily, so long as it is possible to limit the driving force outputted by the internal combustion engine 2. For instance, the determination value HA may be set to be constant, irrespective of the vehicle speed SPD. The degree of limitation of the driving force that is outputted by the internal combustion engine 2 may be modified in accordance with the driving state of the vehicle 1, other than the vehicle acceleration D, for instance by being set to vary in accordance with the vehicle speed SPD alone, or in accordance with the accelerator operation amount ACC.

As the condition for determining that the vehicle 1 is traveling there can be set any condition, for instance condition (6) or condition (7) below, instead of the abovementioned condition (1). In condition (6), the vehicle speed SPD is equal to or greater than a predetermined speed. In condition (7), the vehicle acceleration D is greater than a predetermined value, and the driving force outputted by the internal combustion engine 2 is greater than a predetermined value.

As the operation member of the shift mechanism that is shifted by the driver and that is coupled to the automatic transmission there can be used a member other than a select lever, for instance a member that is operated by a switching button or by sound.

The invention is not limited to a vehicle having installed therein a multistage automatic transmission having a plurality of gear positions, and can be used also in a vehicle in which there is installed a continuously-variable automatic transmission such that a speed ratio is modified in a stepless manner. In a case where the driving control system according to the above-described embodiment is used in a vehicle in which such a continuously variable automatic transmission is installed, it is sufficient to determine that the vehicle is traveling on the basis of the speed ratio of the automatic transmission as grasped by an electronic control system, for instance through setting of condition (8) below, instead of condition (1). Condition (8): the speed ratio of the automatic transmission as grasped by the electronic control system is smaller than a predetermined ratio.

The invention is not limited to a vehicle in which an internal combustion engine is installed as a driving source, and can be used in any vehicle so long as the vehicle has a motor as a driving source and installed therein, for instance a vehicle in which an electric motor is installed as a driving source, or a vehicle in which an internal combustion engine and an electric motor are installed as driving sources.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A driving control system for a vehicle, comprising:
   a shift mechanism that is used in a vehicle in which a motor as a driving source is coupled to wheels via a transmission, and that is configured such that an operation unit coupled to the transmission is selectively shifted to one operating position of a driving position and a non-driving position;
   a position detection device that detects the operation position of the operation unit on the basis of an output signal of a detection unit that is attached to each of the operation positions of the operation unit; and
   a controller that executes a driving force limitation process for limiting a driving force that is outputted from the motor, when it is determined that the operation unit is shifted from the non-driving position to the driving position on the basis of the operation position of the operation unit detected by the position detection device, in a state that an accelerator operation member of the vehicle is operated to an on state;
   wherein the shift mechanism brings the transmission to a power transmission state in which the driving force from the motor is transmitted to the wheels, when the operation unit is operated to the driving position, and brings the transmission to a power interrupt state in which transmission of the driving force from the motor to the wheels is interrupted, when the operation unit is operated to the non-driving position; and
   the controller prohibits the driving force limitation process when it is determined that the vehicle is traveling and that the operation unit is not operated to any of the operation positions on the basis of a detection result by the position detection device.

2. The driving control system for a vehicle according to claim 1, wherein the controller makes the determination that the operation unit is not operated to any of the operation positions on the basis of the detection result by the position detection device immediately before it is determined that the non-driving position has been shifted to the driving position.

3. The driving control system for a vehicle according to claim 1, wherein
the controller determines that the vehicle is traveling when a speed ratio of the transmission is smaller than a predetermined ratio.

4. The driving control system for a vehicle according to claim 1, wherein
the detection unit is a switch that is attached to each of the operation positions to be detected by the detection unit, and that is operated to an on state when the operation unit approaches the detection unit, and is operated to an off state when the operation unit moves away from the operation position.

* * * * *